2 Sheets--Sheet 1.
S. A. THOMPSON & C. T. KENDRICK.
Spring Bed-Bottoms.
No. 138,056. Patented April 22, 1873.
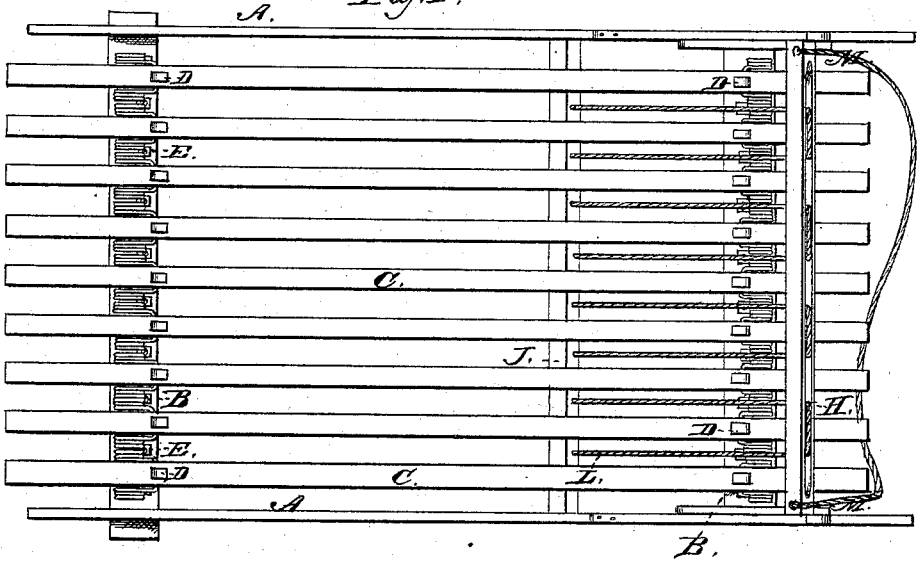
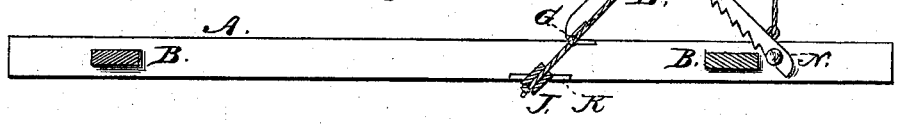
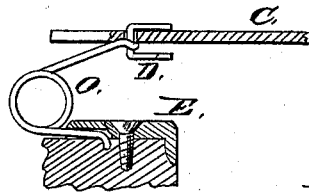
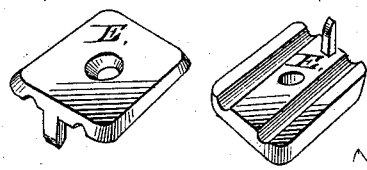
Attest,
Thomas T. Parker
Roberdeau Buchanan
Inventors
Silas A. Thompson
Charles T. Kendrick
By A. W. Kendrick, Attorney.
AM. PHOTO-LITHOGRAPHIC CO. N.Y. (OSBORNE'S PROCESS)

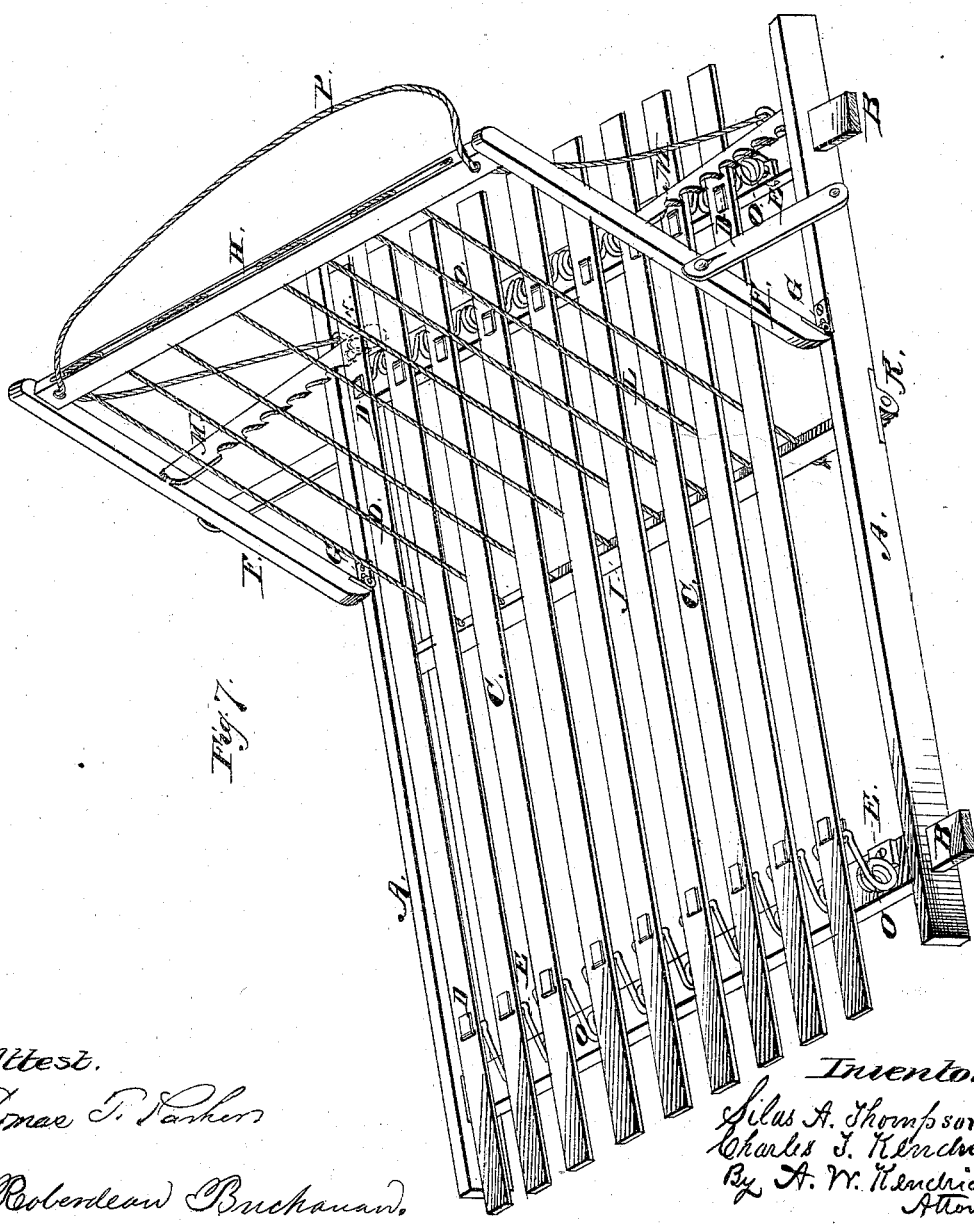

UNITED STATES PATENT OFFICE.

SILAS A. THOMPSON, OF MANCHESTER, MICHIGAN, AND CHARLES T. KENDRICK, OF BROOKLYN, NEW YORK.

IMPROVEMENT IN SPRING BED-BOTTOMS.

Specification forming part of Letters Patent No. 138,056, dated April 22, 1873; application filed April 16, 1873.

*To all whom it may concern:*

Be it known that we, SILAS A. THOMPSON, of Manchester, in the State of Michigan, and CHARLES T. KENDRICK, of the city of Brooklyn and State of New York, have invented a new and useful Invalid and General Purpose Spring Bed-Bottom; and we do hereby declare that the following is a full, clear, and exact description thereof, which will enable others skilled in the art to make and use the same, reference being had to the accompanying drawing forming part of this specification.

Figure 1 is a plan view of our bed-bottom. Fig. 2 represents the hook or loop by which the slats are connected to the springs. Fig. 3 represents a portion of the pawl and ratchet and the pin in the side rail. Fig. 4 is a sectional view, showing the spring-fastener and spring-holder attached to the slat and cross-bar. Fig. 5 is a perspective view, showing the upper and lower bars of the head-elevator. Fig. 6 shows the grooved washer for fastening the springs to the cross-bar. Fig. 7 is a perspective view, showing the elevator raised.

The object of our invention is to furnish a very elastic, easily constructed, and economical bed-bottom which shall be applicable to any bedstead, and which will be especially adapted to the use of old persons, invalids, and all others desiring a more elevated position while sleeping. Our invention consists, first, in the manner of attaching the springs to the cross-bar; second, in the mode of fastening the slat to the spring; and, third, in the construction and arrangement of the adjustable head-raising elevator or invalid attachment.

A represents the side rails, and B the cross-bars, of the frame; C, the slats; D, the spring-holder or reversible hook or loop. E is the grooved washer, by which the spring is held to the bar. F represents the side pieces of the head-elevator or invalid attachment; G, the hinges by which they are fastened to the side rails of the bed-bottom. H is the grooved end piece with tenons and holes. J is the grooved cross-bar with holes. K is the castings by which the cross-bar is attached to the side rails. L is the cord passing through the holes and running in the grooves of the cross-bar and head-piece. M is the pawl with ratchets. N is the pin driven in the side rail. O is the spring. P is the cord by which the head-elevator or invalid attachment is operated.

We make a frame of size and shape to fit an ordinary bedstead, composed only of two side rails and two cross-bars. On the cross-bars we fasten the springs firmly by means of our grooved washer, hereinafter described. We use the lifter or stirrup-spring; but we do not confine ourselves to these, as our clasp and fastenings may be applied to the cone-shaped and other springs with equal advantage. In Fig. 1 we show two rows of springs placed near the ends of the slats. These springs are attached to the slats in the following manner: Mortises are made in the slats near each end large enough to insert a half-inch or five-eighths band-iron. We take a piece of band-iron of proper width and thickness; about seven-eighths of an inch from the end bend the iron to a right angle; then pass it through the mortise in the slat and bend it again to another right angle, leaving enough space between the slat and the iron to insert a number-eight wire, thus forming a complete hook or loop. The hooks face each other on the slat. The spring is then ready to be looped into the hook, which holds the slat in its place and prevents all possibility of its rocking. This spring-holder is simple, cheap, easily made, and cannot be lost in shipping. It is thin and broad, just alike on either side, and presents a smooth even surface for the bedding. It can be constructed of malleable iron or other metal. Whenever the slats sag from continued use they may be readily turned without removing the spring-holder. The ends of the springs are inserted a short distance into the cross-bar. Our fastener is then placed upon the two adjacent arms that rest upon the bar, and held firmly there by means of a screw. In this way one screw holds two springs firmly on the cross-bar. Our fastener consists of a casting about seven-eighths of an inch long by three-fourths of an inch wide, and of sufficient thickness. There are two grooves on either side large enough to admit a number-eight (8) wire, a tooth or teat at one end on the lower side to hold it firmly to the bar, and a screw-hole in the center. By driving the screw home the springs are embedded in the casting and all held firmly to their places.

The adjustable head-elevator or invalid attachment is so constructed that it may be readily detached from the bed, thus forming a general purpose spring-bed or an invalid-bed at pleasure. It consists of two side pieces, an end piece, and a cross-bar, the end piece having two tenons which fit in mortises in the side pieces. The side pieces of the head-elevator are fastened on the upper edge of the side rails of the bed-bottom by means of hinges placed on the under side of the side pieces at the lower end of the same, and fastened firmly to the upper edge of the side rails. The cross-bar is attached to the lower edge of the side rails of the bed-bottom by means of the castings K, which project down so far that in no case shall the cross-bar interfere with the elasticity or the springing of the slats. The castings are attached to the side rails so as to bring the cross-bar nearly on a line with the side pieces of the elevator when raised to an angle of about forty-five degrees. In other words, the cross-bar is so attached that it shall be nearly the same distance from the head-piece whether the elevator be raised or at rest. About midway upon the side pieces pawls with ratchets are pivoted, which engage with a round pin driven in the side rails of the bed-bottom just behind the cross-bar. A cord is attached to the pawls, and runs through holes in the cross-bar, by which the elevator is operated at will. The cross-bar and end piece of the head-elevator are pierced with holes at equal distances apart, and are also grooved upon the upper and lower edge. A cord of sufficient strength, which may be tightened or loosened at pleasure, passes through these holes, running in the grooves and playing between the slats of the bed-bottom, thus completing a perfect head-elevator which does not interfere with the slats of the bed-bottom or the elasticity of the springs.

A piece of webbing or other suitable material may be fastened to the side rails of the bed-bottom, and also to the side pieces of the head-elevator, of sufficient length to prevent the elevator from being raised higher than is desirable.

Having thus fully described our invention, what we claim, and desire to secure by Letters Patent, is—

1. The washer E with its two side grooves, for clasping over the contiguous arms of the springs, with a tooth upon one end, and held to the bar by means of a screw, as described.

2. The spring-holder D, made of band-iron or other flat metal, and forming a reversible hook, in combination with the mortised slat C, spring O, and washer E, as described.

3. The head-elevator or invalid attachment, fastened to the side rails of the bed-bottom by the castings and to the upper edge of the rails by the hinges, with a cord passing through the holes in the grooved pieces, and having the webbing, pawl, and ratchet, which engage with a pin driven in the side rails, as described.

4. The combination of the slats with the grooved washer for fastening the springs, the pin, the hook or loop, the invalid attachment with the grooved head-piece and cross-bar, the webbing, cord, ratchet, and pawl, all constructed as described, and for the purposes set forth.

SILAS A. THOMPSON.
CHARLES T. KENDRICK.

Witnesses:
A. W. KENDRICK,
J. N. STARIN.